Patented July 3, 1951

2,559,439

UNITED STATES PATENT OFFICE 2,559,439

PROCESS OF RECOVERING SULFONATES

Robert C. Jones, Berkeley, and Augustus W. Clark, Oakland, Calif., assignors to Shell Development Company, San Francisco, Calif., a corporation of Delaware No Drawing. Application September 27, 1949, Serial No. 118,193

10 Claims. (Cl. 260—504)

The present invention relates to sulfonates and sulfonic acids and, more particularly, to a method for separating, recovering and purifying sulfonates. The invention is particularly concerned with the recovery of hydrocarbon-soluble sulfonates obtained by sulfonating mineral oil stocks and like hydrocarbon fractions with concentrated sulfuric acid, fuming sulfuric acid or equivalent sulfonating agents followed by a subsequent neutralization, as, for example, with alkali metal oxides, hydroxides and carbonates, ammonia or the various organic bases.

It is well known to acid-treat various hydrocarbon oils with strong sulfuric acid for the purpose of improving certain qualities of the oil, by removing substances therefrom which impart undesirable properties to the oil. Various reaction products are formed in this treatment, including sulfonic acids, some of which are oil-soluble and some oil-insoluble or water-soluble, the amounts of said products depending upon factors such as the nature of the oil, the severity of acid treatment, and the like. It is also well known to recover these sulfonic acids by various methods, as incidental to the purification of the oil. Various methods are also practiced where the principal purpose is to produce either oil-soluble sulfonic acids or oil-insoluble, water-soluble sulfonic acids, or both, as a source of producing their corresponding sulfonates, since the sulfonates of the former have been found to be of increasing value in hydrocarbon oil compositions, such as lubricating compositions, and the sulfonates of the latter are particularly valuable in the preparation of insecticidal spray compositions.

In the preparation and recovery of oil-soluble sulfonic acids and their corresponding sulfonates, it has been the general practice to treat a suitable source of organic compounds, such as a lubricating oil distillate fraction, with a sulfonating agent such as concentrated or fuming sulfuric acid at normal atmospheric or slightly elevated temperatures, and with agitation, until satisfactory reaction takes place, to permit the reaction mixture to stand in a quiescent state so that the formed sludge, generally containing excess acid, oil-insoluble sulfonic acids and various other organic compounds, may separate as a lower layer from the oil and the oil-soluble sulfonic acids dissolved therein. After separation of the two layers, the sulfonic acids in the oil layer are usually recovered therefrom, either as the free acid or as the sulfonate thereof, formed after neutralization with an alkali metal oxide, hydroxide or carbonate, by extraction with a selective solvent such as an aqueous alcoholic solution of a lower molecular weight alcohol, such as methanol, ethanol and propanol. The solvent is then distilled from the aqueous alcoholic solution of the free acid or from the aqueous alcoholic solution of the sulfonate to yield the free acid or the sulfonate, generally admixed with a substantial proportion of organic material and with an appreciable amount of inorganic salts when the sulfonate salts are recovered.

A principal object of the present invention is to provide an improved method of separating sulfonates from mixtures containing the same and particularly from a petroleum hydrocarbon. A further object is to increase the yield of sulfonates recoverable from mixtures thereof and particularly from the oil phase resulting from a sulfonation and neutralization treatment of a suitable mineral oil fraction. A more specific object is to provide a method whereby oil-soluble petroleum sulfonates are obtainable directly from a sulfonation treatment of a lubricating oil fraction, and particularly from a solvent extraction raffinate of a petroleum oil distillate fraction having lubricating viscosity. The accomplishment of these and other objects will be more fully understood from the description of the invention.

It has now been found that sulfonates, particularly oil-soluble sulfonates, such as alkali metal sulfonates and sulfonates produced by the neutralization of sulfonic acid by the various organic bases and ammonia, are economically and effectively recovered from mixtures thereof with various water-immiscible liquids and are separated therefrom by a process which comprises intimately contacting such mixtures with an aqueous extractant at a temperature substantially above 212° F., while maintaining the aqueous extractant in the liquid phase, permitting the resulting intimate mixture to stratify into two layers, the water-immiscible layer and an aqueous layer, separating the layers and recovering the sulfonates from the aqueous layer.

More specifically, in accordance with the present invention, after a mineral oil has been treated in a known manner so as to produce sulfonic acids, both water-soluble and water-insoluble, oil-soluble acids, and to yield an oil layer containing the water-insoluble, oil-soluble sulfonic acids and after the sulfonic acids thus obtained have been neutralized with an alkali metal oxide, hydroxide or carbonate or by ammonia or one of the various organic bases, an oil-sulfonate mixture is treated with a superheated liquid aqueous extractant at a temperature substantially above 212° F. but below the critical temperature of water, and preferably between 290° F. and 450° F., while maintaining the applied pressure sufficient to keep the aqueous extractant in the liquid state. By this means, it has been found possible to dissolve the sulfonates, the salts of the above-neutralized sulfonic acids, in the aqueous extractant and to obtain separation in two layers, one of which is predominantly an aqueous solution of sulfonates, and the other of which is predominantly oil. After separating the layers, the oil layer can be worked up for the recovery of oil therefrom for use as a fuel or for any other suitable purpose, and the aqueous layer used to recover the sulfonates which may be used as additives in mineral lubricating oil and for use in light oil compositions suitable for application to metal surfaces as a rust-preventive agent.

A feature of the present invention includes filtration of the oil-sulfonate mixture prior to treatment with the superheated aqueous extractant. The oil-sulfonate mixture may be diluted with a light mineral oil fraction prior to filtration to reduce viscosity, thus facilitating filtration. Thus, the inorganic salt content of the layer can be reduced by this method. For example, an oil-sulfonate mixture containing 2% inorganic salts before filtration, contained only 0.5% inorganic salts after filtration. This is desirable since any inorganic salts present in the sulfonate layer would concentrate along with the sulfonates in the aqueous phase after treatment. It should be noted that the usual practice of removing the inorganic salts is by washing the mixture with water.

Another feature of the present invention includes the addition of small amounts, up to about 5%, of various compounds, inorganic salts such as calcium chloride, sodium chloride, sodium sulfate, etc., to the aqueous extractant sulfonate phase so as to reduce the tendency to form a stable emulsion on cooling and so as to break out an aqueous layer and thereby cause the rejection of the inorganic salts present in the aqueous layer.

Still another feature of the invention comprises the addition of a water-soluble, oxygenated, substantially neutral, organic liquid to the sulfonate, aqueous extractant system, such as a lower molecular weight alcohol. ketone, aldehyde. Of the alcohols, methyl, ethyl n-propyl, isopropyl, butyl, etc., of the ketones, acetone, methyl ethyl, diethyl, methyl isopropyl, etc.; of the aldehydes, acetaldehyde, propionaldehyde, n-butyraldehyde, etc., and the like are suitable substances. In general, the oxygenated organic liquid may be considered to function to some extent as a demulsifying agent. The above oxygenated organic liquids, in general, are used in proportions varying from 5% to 10% by weight of the amount of water employed. The minimum proportion of such materials to water varies somewhat with the temperature of extraction employed; the higher the temperature, the lower the minimum percentage of said material will be found to be entirely satisfactory. The proportion of oil in the oil sulfonate and its solubility in the resulting aqueous sulfonate solution will also influence the percentage of above said materials desirable to obtain a specified maximum oil content of the aqueous layer. Of course, the solubility of the oil in the aqueous sulfonate also depends on the type(s) of hydrocarbon(s) making up the oil portion of the oil sulfonate and also on the exact nature of the sulfonate(s); both of which will be found to be related in some degree to the source from which the sulfonates were prepared.

In the practice of the present invention, the aqueous liquid extractant and sulfonate mixture are intimately contacted at a temperature substantially above 212° F. The temperature should be such that the sulfonate emulsion present in the aqueous phase after the above mixture has stratified disappears. This temperature has been found to depend upon the weight ratio of the aqueous extractant to the sulfonate mixture; the lower the ratio, the lower the temperature at which this phenomenon occurs. For example, at a water : sulfonate mixture ratio of 3, the temperature at which the sulfonate emulsion in the aqueous phase disappears, to form apparently an aqueous sulfonate solution, is 380° F.; whereas, at an aqueous extractant : sulfonate layer ratio of 0.5, the emulsion-breaking temperature is 290° F. Thus, for all practical applications of the invention, the phrase "substantially above 212° F.," means at least about 50° F. above 212° F., that is, above 260° F. It is, of course, realized that the maximum temperature at which the invention may be practiced is limited by the critical temperature of water, in the neighborhood of 700° F. The operation of the invention at much lower temperatures is preferable for a number of reasons, namely: (1) lower temperatures result in lower applied pressures necessary to keep the system, especially the aqueous extractant, in the liquid phase and thereby avoiding special expensive equipment required for high pressure operation; (2) operations at high temperatures may cause the sulfonate and/or the organic compounds present in the sulfonate mixture to undergo substantial decomposition causing objectionable by-products and possible sulfonate losses; (3) high temperature and corresponding high pressure are generally undesirable because of the attendant hazards.

The ratio of the aqueous extractant to the sulfonate mixture has been found to be important for the most successful and most economical operation of the process. In general, the selection of the aqueous extractant, sulfonate mixture ratio is subject to conditions of temperature, the constitution of the sulfonate mixture and the proportions of any other substances which it may be desired to utilize in the process. Experimental data indicate that the temperature required to break the initial emulsion formed by the addition of the aqueous extractant to the sulfonate mixture increases regularly as the aqueous extractant : sulfonate mixture ratio increases while the time required for phase separation decreases with increasing temperature. Thus, it has been found that aqueous extractant : sulfonate mixture ratios of from 0.5 to 3.0 give satisfactory results but that the ratio 0.75 is preferable for a number of reasons, such as heat economy, quantity of material handled, amount of sulfonate recovered, etc.

It is contemplated that the practice of the present invention is applicable to the recovery of sulfonates formed by the neutralization of either water-soluble or oil-soluble water-insoluble sulfonic acids, with alkali metal oxides, hydroxides and carbonates, ammonia or by the various organic bases, such as the organic nitrogen bases. The invention is of particular importance in the recovery of oil-soluble sulfonates formed by the neutralization of the oil-soluble, so-called mahogany, sulfonic acids produced by the sulfonation of a suitable mineral oil fraction, especially a petroleum oil fraction of lubricating viscosity.

Examples of suitable alkali metal neutralizing agents to form sulfonates from the corresponding sulfonic acids are the hydroxides, oxides and carbonates of sodium, potassium, and lithium, such as sodium hydroxide, sodium carbonate, etc., all yielding the corresponding sodium, potassium or lithium sulfonates. The invention is also applicable to the recovery of sulfonates formed by the neutralization of sulfonic acids by ammonia, either anhydrous or in aqueous solution. In addition, the present invention is also applicable to the sulfonates formed by the neutralization of sulfonic acids with other water-soluble basic-acting materials, such as the various organic bases. Examples of suitable organic bases are organic nitrogen bases such as primary amines, secondary amines, tertiary amines, quaternary ammonium bases including pyridinium, pyrolidinium and quinolinium bases, for example, methyl amine, isopropyl amine, 2-amino butane, tertiary butylamine, di-ethyl amine, di-isopropyl amine, methyl isobutyl amine, pyridine, piperidine, piperazine, triethylamine, tri-isopropyl amine, di-methylbenzyl amine, tetraethyl ammonium hydroxide, trimethyl hexylammonium hydroxide. Polar substituted nitrogen bases such as the alkanolamines, e. g., ethanolamine, triethanolamine, propanolamine, etc., are suitable bases for forming superheated water extractable sulfonates. Likewise, the sulfonates may be formed by the neutralization of sulfonic acids by sulfonium, phosphonium, etc., organic bases.

An obviously necessary requirement for the successful operation of the present invention is that the liquid containing the sulfonate to be recovered therefrom by the aqueous liquid extractant, whether the sulfonate is in solution in said liquid or in the form of a stable or unstable emulsion or suspension therewith, must be immiscible or at least only partly miscible with the aqueous liquid extractant under the conditions of operating the invention. This is so in order for the separation of the aqueous extractant to take place and thereby effectively separate a portion or substantially all of the sulfonate.

The advantages of the present invention are clearly demonstrated by the results of a number of experiments. In these experiments, the results of which are given in Tables I and II, an oil-sulfonate of the following composition, 85% mineral oil, 13% sodium sulfonate and 2% inorganic salts was treated with various amounts of water and at different temperatures.

Table I presents the results obtained when a mineral oil solution of oil-soluble sodium sulfonate of such composition as given in the preceding paragraph was extracted with water at a comparatively low temperature. It should be noted that the time required for settling the resulting emulsion formed when this material was treated with water was extremely long, in most cases a matter of days. Even after this period, the bottom water layer was still an emulsion of water, oil and sodium sulfonate, although the upper oil layer was clear. It was also found that under conditions outlined in Table I, the sodium sulfonate could be de-oiled to only about 50% of the original oil content.

Table I

| Water: Oil Sulfonate Ratio by Weight | Temperature, °F. | Settling Time in Hours | Oil Liberated, Per Cent Wt. of Oil Sulfonate |
|---|---|---|---|
| 0.3 | 190 | 75 | 0 |
| 1.0 | 190 | 80 | 44 |
| 1.0 | 190 | 70 | 41 |
| 3.0 | 190 | 11 | 29 |
| 5.0 | 190 | 75 | 8 |

Table II illustrates the surprising results obtained when the same mineral oil solution containing oil-soluble sodium sulfonate was treated with superheated water. It was found that the oil-sulfonate-water emulsion broke sharply at various elevated temperatures, depending upon the water:oil sulfonate ratio and that phase separation took place in a matter of minutes instead of days. In addition, the bottom water phase was no longer an emulsion but appeared to be a solution of sodium sulfonates in water. Also, because a greater amount of oil was liberated, it was possible to de-oil the sulfonate to about only 5% of the original oil content and at the same time to produce a raffinate oil essentially free of sodium sulfonate.

Table II

| Water : Oil Sulfonate Ratio by Weight | Emulsion-Breaking Temp. | Settling Time, in Minutes | Oil Liberated, Per Cent Weight of Oil Sulfonate Temp., °F. | | | | | | | | | |
|---|---|---|---|---|---|---|---|---|---|---|---|---|
| | | | 325° | 330° | 340° | 360° | 370° | 380° | 390° | 400° | 420° | 430° |
| 0.5 | 290 | 8. | ---- | 67 | ---- | 72 | ---- | ---- | 74 | 76 | ---- | ---- |
| 0.75 | 290 | 4.2 | 69 | ---- | ---- | 73 | ---- | ---- | 75 | ---- | 76 | ---- |
| 0.75 | 300 | 4.2 | ---- | ---- | 73 | 76 | ---- | ---- | 79 | ---- | 79 | ---- |
| 1.0 | 330 | 3.2 | ---- | ---- | ---- | 74 | ---- | ---- | 76 | ---- | 76 | ---- |
| 1.5 | 325 | 3.2 | ---- | 79 | ---- | 76 | ---- | ---- | 76 | ---- | 77 | ---- |
| 2.0 | 340 | 2.7 | ---- | ---- | ---- | ---- | 83 | ---- | ---- | 80 | 72 | ---- |
| 2.0 | 360 | 1.25 | ---- | ---- | ---- | ---- | ---- | 86 | 82 | 83 | 82 | 83 |
| 3.0 | 380 | 1.5 | ---- | ---- | ---- | ---- | ---- | 75 | ---- | ---- | 74 | ---- |

Among the other advantages of the present invention are: (a) a simplified flow process; (b) rapid and complete separation with excellent yields of the sulfonates from a sulfonate mixture; (c) a minimum of equipment requirements; (d) a readily available and inexpensive extractant material (water).

The invention will be further illustrated by the following specific example. However, it is to be understood that the invention is not to be restricted thereby, since there may be wide variations without departing from the spirit of the invention.

A sulfonate mixture (crude mahogany sulfonate) of the following composition: mineral oil 85%, sodium sulfonates 13% and inorganic salts 2%, said sodium sulfonates produced by the neutralization of oil-soluble sulfonic acids in the oil phase with sodium hydroxide, is intimately contacted at 420° F. with an amount of water sufficient to give a water:sulfonate mixture weight ratio of about 0.75. The resulting mixture is then permitted to stratify. After a very short time, approximately five minutes, two layers were formed, an oil layer and an aqueous layer. The oil layer was substantially free of sodium sulfonates and inorganic salts; the aqueous layer contained the sodium sulfonates and inorganic salts, apparently in solution. Under the above conditions, the water preferentially extracted the oil-soluble sodium sulfonates from the oil layer originally containing the same. The two resulting layers were separated; the aqueous layer, after cooling, yielded a sodium sulfonate concentrate of approximately 65% by weight sulfonate, water-free bases, and contained only about 5% by weight of its original oil content, that is, approximately 20% by weight mineral oil, water-free basis.

The process of the present invention may be adapted to continuous operations as well as batch and semi-continuous operations. A preferred way of treating a sulfonate mixture continuously according to this invention is as follows:

A sulfonate material is taken from a suitable source, heated to a suitable temperature between 290° F. and 450° F., for example, 420° F., pumped through a mixing nozzle with hot water at a temperature between 290° F. and 450° F., for example, 420° F., so as to form an intimate, dispersed mixture of water and sulfonate material having a water:sulfonate material ratio of from 0.5 to 3.0 by weight, for example, 0.75, and passed to a settling tank, which is heat-insulated and fitted with internal baffles to promote rapid settling.

The arrangement is such that the temperature in the settling tank is maintained between 290° F. and 450° F., for example, 420° F., and the residence time of a given portion of the mixture therein is adjusted to be from two to ten minutes.

The oil layer and the aqueous layer are withdrawn through reducing valves which are automatically controlled by an element sensitive to the pressure in the settling tank. Differential control of these reducing valves is exercised by an element, e. g., a float sensitive to the interphase level, so that this level is maintained substantially constant. By employing as reducing valves variable displacement-type fluid pressure motors, such as piston motors with variable stroke, or screw-type displacement pump connected by a suitable differential gear mechanism, controlled by the elements sensitive to tank pressure and interphase level, it is possible to achieve some recovery of the pressure energy present in the liquids which can be used in driving the pump required to circulate the liquids.

The aqueous layer, containing the sulfonates, thus may be withdrawn from the settling tank and passed to a suitable vessel wherein it may be cooled and the sulfonates recovered therefrom.

The present invention has been found to be applicable for the recovery of either water-soluble or water-insoluble oil-soluble sulfonates from a mixture thereof with a liquid, whether in solution or present therein as a stable or unstable emulsion or suspension, said liquid being immiscible or at least partially immiscible with the aqueous extractant, water, under the conditions of operating the invention. The invention is particularly applicable in the recovery of oil-soluble alkali metal sulfonates, such as sodium sulfonates, prepared by the oil phase neutralization of oil-soluble sulfonic acids produced by the sulfonation of a mineral oil fraction, particularly a mineral lubricating oil raffinate from a selective solvent extraction. In addition, the invention is applicable in the recovery of oil-soluble sulfonates formed by the sulfonation of other mineral oil fractions, including extracts obtained by selective solvent extraction.

We claim as our invention:

1. The process of recovering oil-soluble sodium petroleum sulfonates from a mixture thereof with mineral oil, which process comprises: intimately contacting at a temperature from about 290° F. to about 450° F. an oil-soluble sodium petroleum sulfonate-oil mixture with liquid water to give a water:oil-sodium petroleum sulfonate weight ratio of from about 0.5 to about 3.0 under sufficient pressure to maintain the water in the liquid state, said temperature being sufficient to break the resulting oil-sodium petroleum sulfonate-water emulsion in the aqueous phase after stratification; permitting the resulting admixture to stratify and separating an aqueous phase comprising oil-soluble sodium petroleum sulfonates with a substantially reduced oil content and an oil phase.

2. The process of recovering oil-soluble sodium petroleum sulfonates from a mixture thereof with mineral oil, which process comprises: intimately contacting at a temperature substantially above 212° F. but below 700° F. an oil-soluble sodium petroleum sulfonate-oil mixture with liquid water to give a water:oil-sodium petroleum sulfonate weight ratio of from about 0.5 to about 3.0 under sufficient pressure to maintain the water in the liquid state, said temperature being sufficient to break the resulting sodium petroleum sulfonate-oil-water emulsion in the aqueous phase after stratification; permitting the resulting admixture to stratify and separating an aqueous phase comprising oil-soluble sodium petroleum sulfonate with a substantially reduced oil content and an oil phase.

3. The process of recovering oil-soluble alkali-metal petroleum sulfonate from a mixture thereof with mineral oil, which process comprises: intimately contacting at a temperature substantially above 212° F. but 700° F. an oil-soluble alkali metal petroleum sulfonate-oil mixture with liquid water to give a water:oil-alkali metal petroleum sulfonate weight ratio of from 0.5 to about 3.0 under sufficient pressure to maintain the water in the liquid state, said temperature being sufficient to break the resulting alkali metal sulfonate-oil-water emulsion in the aqueous phase after stratification; permitting the resulting admixture to stratify and separating an aqueous phase comprising oil-soluble alkali metal petroleum sulfonate with a substantially reduced oil content and an oil phase.

4. The process of recovering oil-soluble sodium petroleum sulfonate from a mixture thereof with mineral oil, which process comprises: intimately contacting at a temperature of about 420° F. an oil-soluble sodium petroleum sulfonate-oil mixture with liquid water to give a water:oil-sodium petroleum sulfonate weight ratio of about 0.75 under sufficient pressure to maintain the water in the liquid state; permitting the resulting admixture to stratify and separating an aqueous phase comprising oil-soluble sodium petroleum sulfonate with a substantially reduced oil content and an oil phase.

5. The process of recovering oil-soluble petroleum sulfonates from a mixture thereof with a liquid at least partially immiscible with water under the conditions of the process, said oil-soluble petroleum sulfonates having been formed by the neutralization of oil-soluble petroleum sulfonic acids with a water-soluble basic-acting material, which process comprises: intimately contacting at a temperature substantially above 212° F. but below 700° F. said mixture with liquid water to give a weight ratio of water to said mixture of from about 0.5 to about 3.0 under sufficient pressure to maintain the water in the liquid state, said temperature being sufficient to break the resulting oil-petroleum sulfonate-water emulsion in the aqueous phase after stratification; permitting the resulting admixture to stratify and separating an aqueous phase comprising said oil-soluble sulfonates.

6. The process of recovering oil-soluble petroleum sulfonates from a mixture thereof with a liquid at least partially immiscible with water under the conditions of the process, said oil-soluble petroleum sulfonates having been formed by the neutralization of oil-soluble petroleum sulfonic acids with a water-soluble basic-acting material, which process comprises: intimately contacting at a temperature substantially above 212° F. but below 700° F. said mixture with liquid water to give a weight ratio of water to said mixture of at least about 0.5 under sufficient pressure to maintain the water in the liquid state, the upper limit of said weight ratio being such that the resulting oil-petroleum sulfonate-water emulsion in the aqueous phase after stratification is broken at a temperature of less than about 700° F.; permitting the resulting admixture to stratify and separating an aqueous phase comprising said oil-soluble sulfonates.

7. The process of recovering oil-soluble petroleum sulfonates from a mixture thereof with a liquid at least partially immiscible with water under the conditions of the process, said oil-soluble petroleum sulfonates having been formed by the neutralization of oil-soluble petroleum sulfonic acids with a water-soluble basic-acting material, which process comprises: intimately contacting at a temperature of from about 290° F. to about 700° F. said mixture with liquid water to give a weight ratio of water to said mixture of at least about 0.5 under sufficient pressure to maintain the water in the liquid state, the upper limit of said weight ratio being such that the resulting oil-petroleum sulfonate-water emulsion in the aqueous phase after stratification is broken at a temperature of less than about 700° F.; permitting the resulting admixture to stratify and separating an aqueous phase comprising said oil-soluble sulfonates.

8. The process of recovering oil-soluble alkali-metal petroleum sulfonate from a mixture thereof with mineral oil, which process comprises: intimately contacting at a temperature substantially above 212° F. but below 700° F. an oil-soluble alkali metal petroleum sulfonate-oil mixture with liquid water to give a water:oil-alkali metal petroleum sulfonate weight ratio of at least about 0.5 under sufficient pressure to maintain the water in the liquid state, the upper limit of said weight ratio being such that the resulting oil-petroleum sulfonate-water emulsion in the aqueous phase after stratification is broken at a temperature of less than about 700° F.; permitting the resulting admixture to stratify and separating an aqueous phase comprising said oil-soluble sulfonates.

9. The process of recovering oil-soluble alkali-metal petroleum sulfonate from a mixture thereof with mineral oil, which process comprises: intimately contacting at a temperature of from about 290° F. but below 700° F. an oil-soluble alkali metal petroleum sulfonate-oil mixture with liquid water to give a water:oil-alkali metal petroleum sulfonate weight ratio of at least about 0.5 under sufficient pressure to maintain the water in the liquid state, the upper limit of said weight ratio being such that the resulting oil-petroleum sulfonate-water emulsion in the aqueous phase after stratification is broken at a temperature of less than about 700° F.; permitting the resulting admixture to stratify and separating an aqueous phase comprising said oil-soluble sulfonates.

10. The process of recovering oil-soluble sodium petroleum sulfonates from a mixture thereof with mineral oil, which process comprises: intimately contacting at a temperature substantially above 212° F. but below 700° F. an oil-soluble sodium petroleum sulfonate-oil mixture with liquid water to give a water:oil-sodium petroleum sulfonate weight ratio of at least 0.5 under sufficient pressure to maintain the water in the liquid state, the upper limit of said weight ratio being such that the resulting oil-sodium petroleum sulfonate-water emulsion in the aqueous phase after stratification is broken at a temperature of less than about 700° F.; permitting the resulting admixture to stratify and separating an aqueous phase comprising oil-soluble sodium petroleum sulfonate with a substantially reduced oil content and an oil phase.

ROBERT C. JONES.
AUGUSTUS W. CLARK.

REFERENCES CITED

The following references are of record in the file of this patent:

UNITED STATES PATENTS

| Number | Name | Date |
|---|---|---|
| 1,271,387 | Taveau | July 2, 1918 |
| 1,707,506 | Buc | Apr. 2, 1929 |
| 1,785,270 | Lavirotte | Dec. 16, 1930 |
| 2,187,883 | Lemmon | Jan. 23, 1940 |
| 2,188,770 | Robertson | Jan. 30, 1940 |
| 2,426,540 | Watkins | Aug. 26, 1947 |

Certificate of Correction

Patent No. 2,559,439      July 3, 1951

ROBERT C. JONES ET AL.

It is hereby certified that error appears in the printed specification of the above numbered patent requiring correction as follows:

Column 8, line 47, after "but" insert *below*;

and that the said Letters Patent should be read as corrected above, so that the same may conform to the record of the case in the Patent Office.

Signed and sealed this 29th day of January, A. D. 1952.

[SEAL]

THOMAS F. MURPHY,
*Assistant Commissioner of Patents.*